Figure 1:
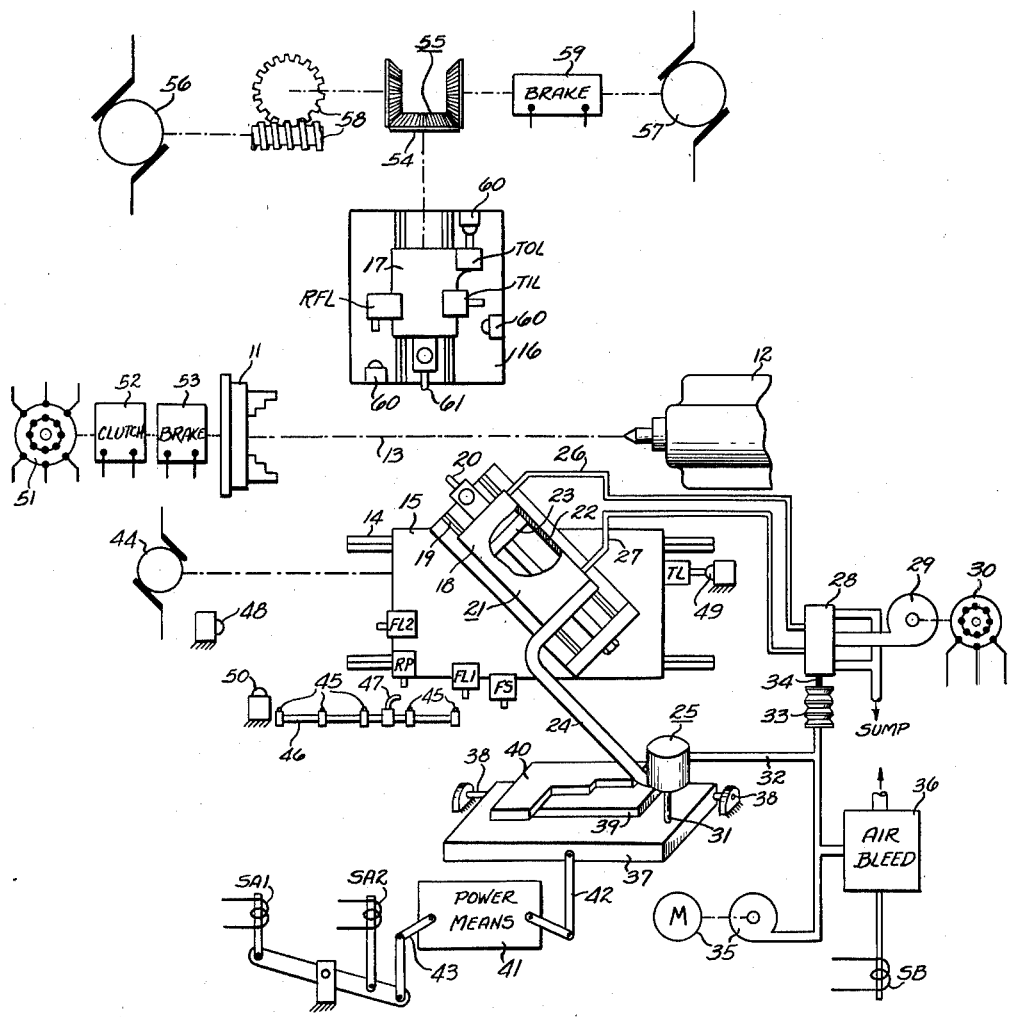

United States Patent Office 2,720,129
Patented Oct. 11, 1955

2,720,129

MACHINE TOOL FOR AUTOMATIC CYCLING

Max De Haas, Dayton, and Claude E. Greene, Sidney, Ohio, assignors to The Monarch Machine Tool Company, a corporation of Ohio Application September 1, 1950, Serial No. 182,792

3 Claims. (Cl. 82—14)

The invention relates in general to engine lathes and more particularly to automatic cycle engine lathes which may be controlled by pattern and tracer means.

The general arrangement of an engine lathe made in accordance with this invention is the inclusion of a carriage slidably carrying a cross slide which moves on the carriage at an acute angle to the direction of movement of the carriage and which is controlled by a tracer which cooperates alternatively with roughing cut and finishing cut templates in order to provide a roughing cut cycle and automatically thereafter a finishing cut cycle of operation of a tool carried by the cross slide. The lathe also includes a continuously variable speed drive for moving the carriage in its feed left condition and still further automatic feed speed change means are provided for changing the rate of feed at any point in the feed left cycle such as may be desirable when different diameters of the workpiece are encountered. A novel feature of the invention is the fact that the automatic feed speed change means may be held inoperative during the roughing cycle operation and may only be brought into use during the finishing cut operation. The engine lathe further incorporates a rear slide driven by two separate motors, one for feed in and the other for traversing both in and out. A further novel feature of the invention is the fact that the rear slide may be brought into use by movement of the carriage at any time during the rough or finish cut operation or after the tool on the cross slide has completed its work operation upon the workpiece. This latter may be effected by the fact that the cross slide, being disposed at an acute angle, may be caused to withdraw perpendicularly from the axis of the workpiece by a compound movement of the cross slide and carriage and effected by a right angle shoulder on the template. Thus, the carriage is still feeding left, and this feed left movement may be utilized to effect the operation of the rear slide.

An object of the invention is to provide a completely automatic cycle lathe having a variety of features which are easily selectable by the set-up man when setting up a given work operation, and which are further selectable at will by the operator of the lathe.

Another object of the invention is to provide a rear slide on a lathe which is brought into operation at any time during or after completion of the cutting portion of a work cycle by a front slide which is disposed at an acute angle to the axis of the workpiece.

Still another object of the invention is to provide two pattern means for cooperation with a tracer means which may be used for rough and finish cuts, respectively, on an engine lathe, and wherein a slide is driven by a variable speed drive independently of control by pattern and tracer means, which slide may be changed in drive speed in accordance with the position of the slide, and further wherein this automatic change in drive speed may selectively be rendered inoperative for the first or roughing cut governed by roughing cut pattern means.

Figure 2:
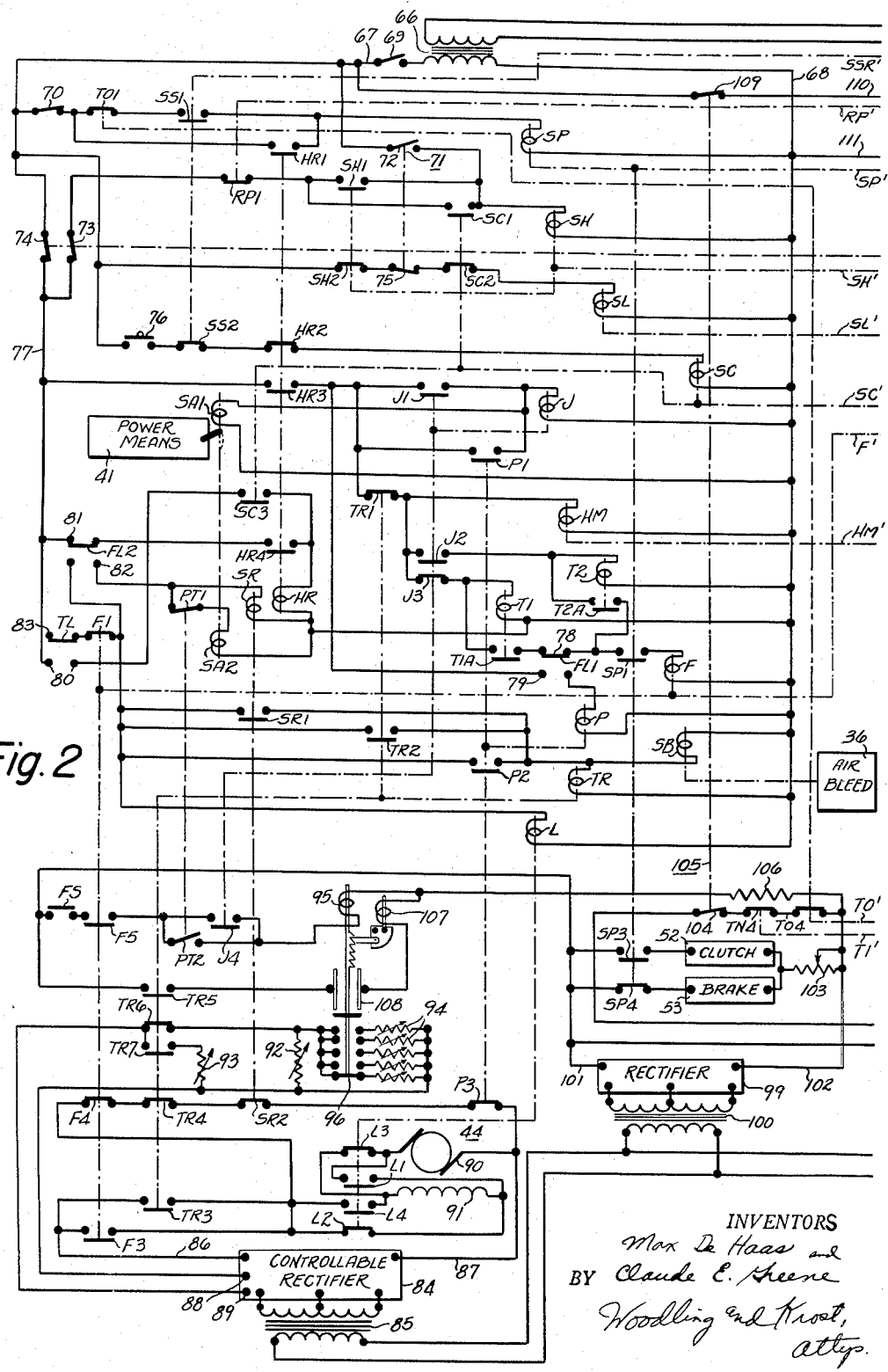
Figure 3:
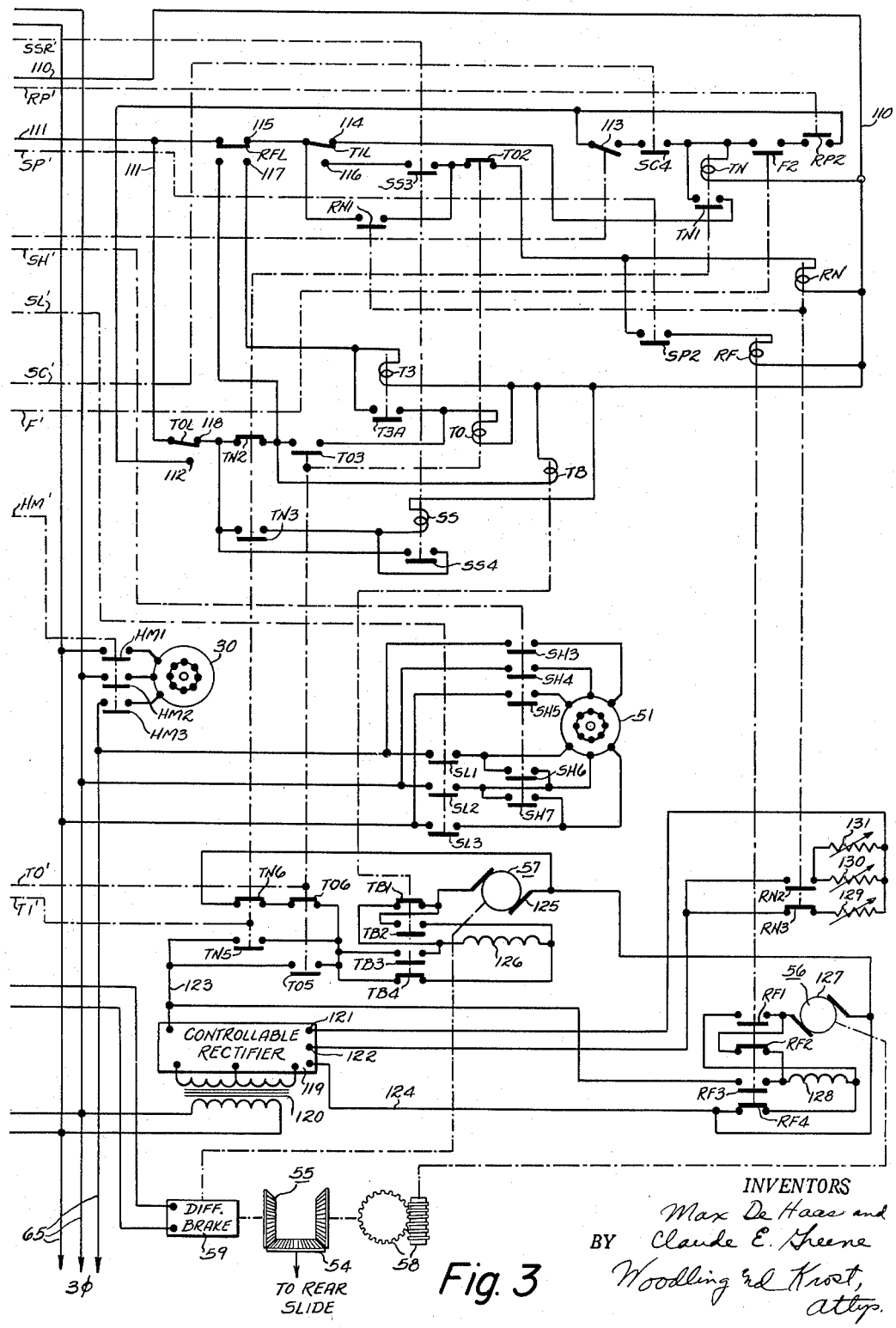

Other objects and a fuller understanding of the invention may be had by referring to the following description and claims, taken in conjunction with the accompanying drawings, in which:

Figure 1 is a diagrammatic representation of an engine lathe showing the various slides, pattern means, motors and switches cooperating to produce an automatic cycle lathe; and Figures 2 and 3 together comprise a schematic wiring diagram showing the electrical and mechanical interconnections for the electrical components of the automatic cycle lathe of Figure 1.

Figure 1 shows a diagrammatic view of a lathe having a headstock 11 and a tailstock 12 defining a work axis 13. The lathe also has bed rails 14 for supporting a carriage 15 and has a rear support 16 for slidably carrying a rear slide 17. The carriage 15 is movable parallel to the axis 13 and carries a cross slide 18 slidable on cross slide ways 19 which are at an acute angle to the work axis 13 which in this case has been shown as a 45-degree angle. The cross slide 18 carries a front tool 20 and includes a hydraulic servomotor 21 which includes a cylinder 22 movable with the cross slide 18 and a piston 23 fixed to the cross slide ways 19. An extension arm 24 of the cross slide 18 carries a tracer mechanism 25. The hydraulic servomotor 21 is moved in accordance with the hydraulic fluid introduced into the front or rear of the cylinder 22 by the conduits 26 and 27, respectively, and these conduits conduct fluid in accordance with the setting of a directional valve 28 which in turn obtains fluid from a fluid pump 25 driven by an electric motor 30.

The tracer mechanism 25 has a movable tracer finger 31 and movement of this tracer finger thereof variably bleeds compressed air to atmosphere with the compressed air being delivered to the tracer mechanism 25 by the air conduit 32. A bellows 33 is a form of pressure responsive device for changing the variations in air pressure in the conduit 32 into a mechanical movement which is transmitted by the link 34 to the directional valve 28 for controlling the position thereof. Air pressure is delivered to the air conduit 32 by the air pump 35 and the compressed air from this conduit 32 may be bled to atmosphere by an air bleed mechanism 36 operated by a solenoid SB.

The lathe further carries a pattern support table 37 pivoted to the bed of the lathe at 38. The pattern support table 37 and tracer mechanism 25 have been shown isometrically in the Figure 1 to better illustrate the function thereof. A roughing cut template 39 and a finishing cut template 40 may be fastened to the pattern support table 37 in overlapping relationship for alternative cooperation with the movable tracer finger 31. The pattern support table 37 may be swiveled up and down by a power means 41 through the agency of a link 42. The power means 41 is controlled by movement of an arm 43 which in turn is controlled by a first solenoid SA1 and a second solenoid SA2.

The carriage 15 is driven by a continuously variable speed feed motor 44 which is controlled by various switches and control means that are subsequently described. The movement of the carriage 15 may be changed by actuation of a feed speed change switch FS, first and second feed limit switches FL1 and FL2 and a traverse limit switch TL. The feed speed change switch FS may be actuated by a plurality of dogs 45 mounted on a bed rail 46 which also carries a special dog 47 for actuating the first feed limit switch FL1. The second feed limit switch FL2 may be actuated by a dog 48 carried on the bed of the lathe and the traverse limit switch TL may be actuated by a dog 49 which also is carried on the bed of the lathe. A rear pickup switch RP is also mounted on the carriage 15 and may be actuated by a dog 50 carried by the bed of the lathe.

The headstock 11 is driven by a headstock motor 51 through a spindle clutch 52 and a spindle brake 53. The rear slide 17 is driven from the output 54 of a differential 55 which has one input driven by a rear feed motor 56 through a worm and gear arrangement 58 and has another input driven by a rear traverse motor 57 through an electrically actuated differential brake 59. The rear slide 17 carries a rear tool 61 and three switches which control the movement of this slide 17, these switches being a rear feed limit switch RFL and traverse in and traverse out limit switches TIL and TOL, respectively. These switches are actuated by dogs 60 carried on the rear support 16.

The electrically connecting wires of the electrical components of the diagrammatic Figure 1 are shown as being broken off a short distance from the electrical components. The electrical interconnection of these components is shown in the schematic diagram of Figures 2 and 3 which make a complete diagram when laid side by side, with Figure 3 to the right of Figure 2. The dash-dot mechanical connections of the relays are designated by the same reference character as the relay, with a prime (') added thereto. Figures 2 and 3 show three phase power lines at 65, two of which energize a control transformer 66, the control transformer 66 energizes first and second control lines 67 and 68 through a control switch 69. Connected across the lines 67 and 68 is a stop cycle relay SP through a stop cycle switch 70, traverse out relay contacts TO1 and spindle stop relay contacts SS1. Hold in relay contacts HR1 are paralleled across the series combination of the traverse out relay contacts TO1 and the spindle stop relay contacts SS1. A spindle high relay SH is connected across the lines 67 and 68 through upper contacts 72 of a spindle switch 71. The spindle high relay SH may also be connected across the lines 67 and 68 through the hold in contacts SH1 of the spindle high relay SH, first contacts RP1 of a rear pickup switch RP and series-connected contacts 73 and 74 of a front feed switch. Start cycle relay contacts SC1 are connected in parallel with the spindle high relay contacts SH1. A spndile low relay SL is connected across the lines 67 and 68 through start cycle relay contacts SC2, lower contacts 75 of the spindle switch 71 and spindle high relay contacts SH2. A start cycle relay SC is connected across the lines 67 and 68 through hold in relay contacts HR2, spindle stop relay contacts SS2 and a normally open start push button 76. A line 77 is connected to the line 67 through the front feed switch 74. A jumper relay J is connected acorss the lines 77 and 68 through the jumper relay contacts J1 and hold in relay contacts HR3. A first solenoid SA1 is connected in parallel with the jumper relay J. Pickup relay contacts P1 are connected in parallel with the jumper relay contacts J1. A hydraulic motor relay HM is connected across the lines 77 and 68 through traverse right relay contacts TR1 and the hold in relay contacts HR3. A second timer T2 is connected in parallel with the hydraulic motor relay HM through the jumper relay contacts J2. Also connected in parallel with the hydraulic motor relay HM is the series combination of a first timer T1 and the jumper relay contacts J3. A feed left relay F is connected in parallel with the second timer T2 through stop cycle relay contacts SP1 and second timer contacts T2A. The feed left relay F is also connected in parallel with the first timer T1 through the stop cycle relay contacts SP1, upper contacts 78 of the first feed limit switch FL1 and first timer contacts T1A. A pickup relay P is connected across the lines 77 and 68 through the lower contacts 79 of the first feed limit switch FL1 and the hold in relay contacts HR3.

A hold in relay HR is connected across the lines 77 and 68 through start cycle relay contacts SC3 and the lower contacts 80 of a traverse limit switch TL. The hold in relay HR is also connected across the lines 77 and 68 through the hold in relay contacts HR4 and the upper contacts 81 of the second feed limit switch FL2. A solenoid relay SR is connected across the lines 77 and 68 through the lower contacts 82 of the second feed limit switch FL2, the feed left relay contacts F1 and the upper contacts 83 of the traverse limit switch TL. A second solenoid SA2 is connected in parallel with the solenoid relay SR through pattern table switch contacts PT1. A traverse right relay TR is connected across the lines 77 and 68 through solenoid relay contacts SR1, the feed left relay contacts F1 and the contacts 83 of the traverse limit switch TL. Traverse right relay contacts TR2 are in parallel wih the solenoid relay contacts SR1 and likewise pickup relay contacts P2 are also in parallel with the solenoid relay contacts SR1. An air bleed solenoid SB is connected in parallel with the traverse right relay TR. This air bleed solenoid SB operates the air bleed mechanism 36 shown in both Figures 1 and 2. A longitudinal brake relay L is connected in parallel with the series combination of the traverse right relay TR and the contacts TR2 thereof.

A controllable rectifier 84 is connected across two of the three phase lines 65 by a transformer 85 and supplies variable amounts of rectified energy across the lines 86 and 87. The rectifier 84 has first and second control terminals 88 and 89. The rectifier 84 supplies a variable energization to the feed motor 44. The feed motor 44 has an armature 90 and a field 91. The armature 90 and field 91 are connected in series across the output lines 86 and 87 through the normally closed longitudinal brake contacts L3 and L2, and the feed left relay contacts F3. The armature 90 and field 91 may also be connected across the lines 86 and 87 with the field 91 reversed relative to the armature 90 by the normally open longitidinal brake relay contacts L1 and L4, and the feed left relay contacts F3. The traverse right relay contacts TR3 are connected in parallel with the feed left relay contacts F3. A dynamic braking circuit which connects the field 91 across the armature 90 also may be effected through contacts L2 and L3, the feed left relay contacts F4, the traverse right relay contacts TR4, the solenoid relay contacts SR2 and the pickup relay contacts P3. The control terminals 88 and 89 are adapted to have a variable resistance placed thereacross, for example, for bias purposes on a thermionic tube which thus controls the energization of the output of the controllable recifier 84. Connected across the control terminals 88 and 89 is the series combination of the traverse right relay contacts TR6 and a maximum feed rate potentiometer 92. Also connected across these control terminals 88 and 89 is the series combination of the traverse right relay contacts TR7 and a front traverse rate potentiometer 93. In parallel with the maximum feed rate potentiometer 92 is a group of five feed step-up potentiometers 94, each having connected in series therewith one of five contacts of a step-up relay 95. These contacts are adapted to be contacted in succession by a step-up relay blade 96.

A rectifier 99 is supplied by a transformer 100 from a single phase of the three phase lines 65 and has a rectified output across the lines 101 and 102. Connected across the lines 101 and 102 is the series combination of a control rheostat 103, the spindle brake 53 and stop cycle relay contacts SP4. Also connected across the lines 101 and 102 is the series combination of the control rheostat 103, the spindle clutch 52 and stop cycle relay contacts SP3. The differential brake 59 shown on Figure 3 is connected across the lines 101 and 102 through the lower contacts 104 of a rear feed off-on switch 105, traverse in relay contacts TN4, and traverse out relay contacts TO4. The step-up relay 95 is also connected across the lines 101 and 102 through a voltage dropping resistor 106, jumper relay contacts J4, feed left relay contacts F5 and the normally open feed speed change switch FS. Connected in parallel with the jumper relay contacts J4 are the lower pattern table switch contacts PT2. A reset coil 107 for the step-up relay 95 is also connected across the lines 101 and 102 through the voltage dropping resistor 106, reset coil contacts 108 on the step-up relay 95 and the traverse right relay contacts TR5.

The Figure 3 shows a continuation of the schematic wiring diagram and the upper part thereof shows the electrical connections for the rear slide 17. The first control line 67 extends to a control line 110 on the circuit of Figure 3 through the upper contacts 109 of the rear feed off-on switch 105. The second control line 68 has a branch control line 111 extending to this circuit diagram of Figure 3. A traverse in relay TN is connected across the control lines 110 and 111 through the feed relay contacts F2, second contacts RP2 of the rear pickup switch RP and the lower contacts 112 of the traverse out limit switch TOL. The traverse in relay TN may also be connected across the lines 110 and 111 through the start cycle relay contacts SC4, the third front feed switch 113 and the contacts 112 of the traverse out limit switch TOL. The third front feed switch 113 is closed when the first and second front feed switches 73 and 74 are open and all three switches are linked together. The traverse in relay TN may also be connected across the lines 110 and 111 through the hold in contacts TN1 of the traverse in relay TN, the upper contacts 114 of the traverse in limit switch TIL, and the upper contacts 115 of the rear feed limit switch RFL. A rear feed interlock relay RN is connected across the lines 110 and 111 through the traverse out relay contacts TO2, spindle stop relay contacts SS3, the lower contacts 116 of the traverse in limit switch TIL and the upper contacts 115 of the rear feed limit switch RFL. Contacts RN1 of the rear feed interlock relay RN are connected in parallel with the serially connected contacts SS3 and contacts 116. A rear feed relay RF is connected in series with the stop cycle relay contacts SP2 and this series combination is connected across the rear feed interlock relay RN. A rear slide dwell timer or third timer T3 is connected across the lines 110 and 111 through the lower contacts 117 of the rear feed limit switch RFL, the traverse in relay contacts TN2 and the upper contacts 118 of the traverse out limit switch TOL. A traverse out relay TO is connected in series with the contacts T3A of the third timer T3 and this series combination is connected across the third timer T3. The traverse out relay TO is also connected across the lines 110 and 111 through the traverse out relay contacts TO3, the traverse in relay contacts TN2 and the upper contacts 118 of the traverse out limit switch TOL. A transverse brake relay TB is connected across the lines 110 and 111 through the traverse in relay contacts TN2 and the upper contacts 118 of the traverse out limit switch TOL. A spindle stop relay SS is connected across the lines 110 and 111 through the hold in contacts SS4 of this relay and the upper contacts 118 of the traverse out limit switch TOL. Contacts TN3 of the traverse in relay TN are connected in parallel with the contacts SS4 of the spindle stop relay SS.

The electric motor 30 which drives the fluid pump 29 is connected across the three phase lines 65 through the contacts HM1, HM2, and HM3 of the hydraulic motor relay HM. The headstock motor 51 is connected across the three phase lines 65 through the spindle high relay contacts SH3, SH4 and SH5. The headstock motor 51 is a two-speed motor and the connections to the lower speed windings thereof are made to the three phase power lines 65 through the spindle low relay contacts SL1, SL2 and SL3. Short circuiting contacts to short circuit the low speed windings of the headstock motor 51 are provided by the spindle high contacts SH6 and SH7.

A controllable rectifier 119 is connected across two of the three phase power lines 65 by a transformer 120 and supplies a variable amount of rectified energy to the rear traverse motor 57 and to the rear feed motor 56. The controllable rectifier 119 has first and second control terminals 121 and 122 and first and second output leads 123 and 124. The rear traverse motor 57 includes an armature 125 and a field 126 which may be connected in series across the leads 123 and 124 through the transverse brake relay contacts TB1 and TB4, and the traverse out relay contacts TO5. The armature 125 and field 126 may be connected across the leads 123 and 124 with the field reversed relative to the armature through the transverse brake relay contacts TB2 and TB3, and the traverse out relay contacts TO5. The traverse in relay contacts TN5 are connected in parallel with the contacts TO5. A dynamic braking circuit which connects in series the armature 125 and field 126 may be effected through contacts TB1 and TB4, traverse out relay contacts TO6 and the traverse in relay contacts TN6.

The rear feed motor 56 has an armature 127 and field 128, which may be connected in series across the leads 123 and 124 through the normally open rear feed relay contacts RF1 and RF3. The armature 127 may be connected in series with a reversedly connected field 128 through the normally closed rear feed relay contacts RF2 and RF4 to form a dynamic braking circuit.

The first and second control terminals 121 and 122 are adapted to have a variable resistance placed thereacross and the variations in this resistance control the output to the leads 123 and 124 of the rectifier 119. A rear traverse rate potentiometer 129 is connected by the rear feed interlock relay contacts RN3 across the terminals 121 and 122. A rear feed rate potentiometer 130 is connected in series with rear feed interlock relay contacts RN2 across the terminals 121 and 122. A rear maximum feed rate potentiometer 131 is connected in parallel with the potentiometer 130.

*Operation.*—The operation of a complete automatic cycle arrangement of the lathe of Figure 1 will next be described, which includes the operation of the carriage 15, the cross slide 18, the pattern support table 37 and the rear slide 17. The control system is adapted to provide a roughing cut as controlled by the roughing cut template 39 and thence to immediately follow with a finishing cut as controlled by the finishing cut template 40. The pattern support table 37 is shown as being in its down position in Figure 1 as controlled by the power means 41 and this table 37 needs to be swiveled to the up position in order that the tracer finger 31 may cooperate with the roughing cut template 39, which is below the finishing cut template 40. The cross slide 18 is shown as being in its retracted position wherein the front tool 20 is farthest removed from the workpiece axis 13. In this position the tracer finger 31 is not in contact with the roughing cut template 39. To start the first of the two cycles, it will be assumed that the first and second front feed switches 73 and 74 are closed and that the third front feed switch 113 is opened. Further, the rear feed off-on switch contacts 109 and 104 are closed to thus ensure operation of the rear slide 17. The stop cycle switch 70 should be closed. The pattern table switch contacts PT1 should be closed and the contacts PT2 open. This pattern table switch may be operated by movement of the pattern support table 37 or alternatively, it may be manually operable. The upper contacts 72 of the spindle switch 71 should be open and the lower contacts 75 thereof closed in order to achieve high and low spindle speeds for different portions of the automatic cycle. Since the carriage 15 is at its right limit the traverse limit switch TL will be actuated. Also since the rear slide 17 is fully retracted the traverse out limit switch TOL will be actuated. It shall now be assumed that the three phase lines 65 are energized, thus energizing the four transformers 66, 85, 100 and 120. This energizes the rectifiers 84, 99 and 119. Energization of the rectifier 99 energizes the spindle brake 53 and the differential brake 59. Further the power means 41 is energized and since the second solenoid SA2 will have been energized from the previous cycling operation, the arm 43 will be in the up position which will cause the power means 41 to swivel the pattern support table 37 upwardly. This establishes the roughing cut template 39 in a position for cooperation with the tracer finger 31. The air pump 35 is also started to supply compressed air to the tracer mechanism 25 and to the bellows 33. Since the tracer finger 31 is not in contact with any template it is bleeding very little air to atmosphere, and hence the bellows 33 is under high air pressure so as to be extended. In such condition the directional valve 28 is positioned to direct hydraulic fluid to the forward end of the cylinder 22. The three motors 44, 56 and 57 are all dynamically braked by having the armature connected in series with the field thereof. Next the control switch 69 is closed which energizes the spindle low relay SL to start the headstock motor 51 and operate it in its low speed condition. The start cycle button 76 is next depressed which energizes at least momentarily the start cycle relay SC, this de-energizes the spindle low relay SL and energizes the spindle high relay SH to cause the headstock motor 51 to run at high speed. Further, the hold in relay HR is energized and held in by the contacts HR4 thereof. The stop cycle relay SP is energized by the contacts HR1 and the closing of the contacts HR3 energizes the first timer T1 and the hydraulic motor relay HM. Energization of this latter relay starts the motor 30 driving the fluid pump 29 to thus drive the servomotor 21 forward. The cylinder 22 of the servomotor 21 will move forward since the air pressure from the air pump 35 will condition the directional valve 28 so that hydraulic fluid is sent to the forward end of the servomotor 21. Energization of the stop cycle relay SP energizes the spindle clutch 52 and de-energizes the spindle brake 53. The start cycle relay SC is deenergized when the start push button 76 is released.

The cross slide 18 will move in under the force of the hydraulic fluid until the tracer finger contacts the roughing cut template 39. This then establishes the position of the front tool 20 relative to the workpiece axis 13. The first timer T1 is adjustable and has previously been set to time out, that is to close the contacts T1A thereof, after the completion of movement of the cross slide 18. The closing of the contacts T1A energizes the feed left relay F which by closing the contacts F3 thereof starts the feed motor 44 in a feed condition. The rate of feed is determined by the maximum feed rate potentiometer 92 and also is determined by the lowermost of the five feed step-up potentiometers 94. This is because the blade 96 of the step-up relay 95 is in its lowermost position. Feed left movement of the carriage 15 will de-actuate the traverse limit switch TL which will cause no change in the operation.

The carriage 15 will now feed left at the preset feed rate, and the cross slide 18 will be moved under the dictates of the roughing cut template 39 by the agency of the tracer mechanism 25 and servomotor 21. Right angle steps and tapers in the template 39 will cause the cross slide 18 to be retracted from the workpiece axis 13. The feed speed change switch FS may be actuated by one of the plurality of dogs 45; however, the step-up relay 95 will not be actuated to change the rate of feed left since the jumper relay contacts J4 are open and also the pattern table switch contacts PT2 are open. Thus, these open contacts provide means for selectively preventing the automatic feed speed change during the cycle of operation which is governed by the roughing cut template 39. The feed left of the carriage 15 continues until the first feed limit switch FL1 is actuated by the special dog 47. This de-energizes the feed left relay F and also the feed motor 44. The pickup relay P is energized which by closing the contacts P1 thereof energizes the jumper relay J and the first solenoid SA1. Energization of the first solenoid SA1 actuates the power means 41 to move the pattern support table 37 down, thus establishing the finishing cut template 40 in a plane for subsequent cooperation with the tracer finger 31. Energization of the jumper relay J causes de-energization of the first timer T1 by opening the contacts J3. De-energization of the feed relay F closes the contacts F1 thereof to energize the longitudinal brake relay LB which reverses the field 91 relative to the armature 90 of the feed motor 44. Thus, a dynamic braking circuit is established for this motor. Energization of the pickup relay P closes the contacts P2 thereof to energize the traverse right relay TR which stays energized through the hold in contacts TR2 thereof. The air bleed solenoid SB is also energized with the traverse right relay TR and, as seen in Figure 1, this bleeds air to atmosphere to lower the air pressure in the air conduit 32. This collapses the bellows 33 and hence the directional valve 28 is conditioned to retract the cross slide 18 from the workpiece axis 13. Furthermore the motor 30 driving the fluid pump 29 is stopped by the opening of the traverse right relay contacts TR1, thus de-energizing the hydraulic motor relay HM. Since the traverse right relay TR is energized the contacts TR3 close and the contacts TR4 open so that the motor 44 drives the carriage 15 in a reverse direction, that is, traverse right. This is because the longitudinal brake relay LB is now energized. The traverse right relay contacts TR6 are now open and the contacts TR7 closed so that the front traverse rate potentiometer 93 establishes the rate of speed of the motor 44. This will preferably be made a high rate of speed so that the carriage 15 will rapidly traverse to the right. As the carriage 15 traverses to the right the first feed limit switch FL1 is de-actuated to de-energize the pickup relay P. The traverse right of the carriage 15 will eventually actuate the traverse right limit switch TL which de-energizes the traverse right relay TR, the longitudinal brake relay L and the air bleed solenoid SB. This de-energizes the feed motor 44, and it is dynamically braked since the field 91 is reversedly connected to the armature 90. The closing of the traverse right relay contacts TR1 energizes the hydraulic motor relay HM and the second timer T2. De-energization of the air bleed solenoid SB and energization of the motor 30 will cause the cross slide 18 to again move inwardly until the tracer finger 31 contacts the finishing cut template 40. The second timer T2 is then set to time out after completion of movement of the cross slide 18, and hence the contacts T2A will close. This energizes the feed left relay F to cause the feed motor 44 to come up to a speed as dictated by the lowermost of the five feed step-up potentiometers 94. Feed left movement of the carriage 15 will de-actuate the traverse limit switch TL but there is no change in the control system. Feed left of the carriage 15 now continues under the dictates of the finishing cut template 40.

The feed speed change switch FS will be intermittently actuated by the dogs 45 to actuate the step relay 95. This will occur because the feed left relay contacts F5 are closed and also the jumper relay contacts J4 are closed. The changing feed rate, as automatically established by the step-up of the step relay 95, may be used to achieve substantially constant rate of material removal from a workpiece by the tool 20 for changing diameters of this workpiece.

The rear pickup switch RP may be actuated by the dog 50 to establish the operation of the rear slide 17. In the operation of the complete automatic cycle lathe as described, this initiation of movement of the rear slide 17 should be after completion of the cutting operation by the front tool 20. The finishing cut template 40 is preferably so constructed that the tracer finger 31 will scan a right angle shoulder on this template at the completion of the cutting portion of the movement of the front tool 20. Thus, the cross slide 18 will be retracted from the workpiece axis 13 and the continued feed left movement of the carriage 15 will impart a compound movement to the tool 20 so that it moves perpendicularly to the workpiece axis 13. It is this continued feed left movement of the carriage 15 which causes actuation of the rear pickup switch RP after completion of cutting by the front tool 20. The rear tool 61 carried on the rear slide 17 may be a necking tool to provide grinding relief at a shoulder of the workpiece and, of course, multiple tools may be carried on this rear slide 17 to provide grinding relief cutting operations for a plurality of shoulders. This cutting operation would conveniently be carried out after completion of the cutting operation of the front tool 20.

Actuation of the rear pickup switch RP opens the contacts RP1 and closes the contacts RP2. Opening of the contacts RP1 de-energizes the spindle high relay SH. De-energization of the spindle high relay closes the contacts SH2 thereof to energize the spindle low relay SL; thus, the headstock motor 51 is energized in the low speed condition. This low speed condition is frequently desirable where heavy cuts of a workpiece are to be removed. If a lowered spindle speed is not desired the spindle switch 71 may be thrown in the opposite direction to close the contacts 72 and open the contacts 75 thereof which maintains the spindle high relay SH continually energized. Since the contacts F2 of the feed left relay are closed, the closing of the rear pickup switch contacts RP2 will energize the traverse in relay TN. This de-energizes the differential brake 59 by opening the contacts TN4, and hence the rear slide 17 is driven inwardly by the rear traverse motor 57. The speed of this rear traverse motor 57 is controlled by the bias established by the rear traverse rate potentiometer 129. Movement of the rear slide 17 will de-actuate the traverse out limit switch TOL to energize the spindle stop relay SS through the now closed traverse in relay contacts TN3. Further movement of the rear slide 17 will actuate the traverse in limit switch TIL which de-energizes the traverse in relay TN and energizes the rear feed interlock relay RN and the rear feed relay RF. Since the traverse out limit switch TOL is now de-actuated and the traverse in relay contacts TN2 are closed, the transverse brake relay TB is energized which establishes a dynamic braking circuit for the rear traverse motor 57. Further the differential brake 59 is again energized to prevent rotation of the differential 55 at the input from the differential brake 59. The rear feed motor 56, by closing the contacts RF1 and RF3 of the rear feed relay RF, will now come up to a speed dictated by the setting of the two potentiometers 130 and 131.

The rear slide 17 now feeds in until the rear feed limit switch RFL is actuated which de-energizes the rear feed interlock relay RN and rear feed relay RF. Also the contacts 117 of the rear feed limit switch RFL are closed to energize the third timer T3. The rear feed motor 56 is dynamically braked by the de-energization of the rear feed relay RF, and since this motor drives through a worm and gear arrangement 58 there is a short dwell for cleanup of the workpiece. When the third timer T3 times out, the contacts T3A thereof close to energize the traverse out relay TO. This opens the contacts TO4 thereof to de-energize the differential brake 59, and hence the rear traverse motor 57 will come up to traverse speed to rapidly retract the rear slide 17. As the rear slide 17 is retracted the rear feed limit switch RFL is de-actuated which de-energizes the third timer T3.

At sometime after the rear pickup switch RP is actuated the second feed limit switch FL2 may be actuated. This terminates leftward movement of the carriage 15 and initiates the traverse right movement thereof. Actuation of this second feed limit switch FL2 de-energizes the hold in relay HR and energizes the solenoid relay SR and second solenoid SA2. The de-energization of the hold in relay HR opens the contacts HR3 thereof which de-energizes the jumper relay J, the first solenoid SA1, the hydraulic motor relay HM, the second timer T2 and the feed left relay F. The contacts F1 of the feed left relay F now close to energize the longitudinal brake relay L, and hence the feed motor 44 is dynamically braked. The energization of the solenoid relay SR has closed the contacts SR1 thereof to energize the traverse right relay TR and the air bleed solenoid SB. Thus, the tracer mechanism 25 is rendered inoperative so that there is no tendency for the cross slide 18 to move inwardly. Further the motor 30 driving the fluid pump 29 is now de-energized. Energization of the second solenoid SA2 will condition the power means 41 to swivel the pattern support table 37 upwardly. This places the roughing cut template 39 in a plane for cooperation with the tracer finger 31 for the first of the next two automatic cycles. The energization of the traverse right relay TR will cause the feed motor 44 to come up to a traverse rate for traverse right of the carriage 15. Further, the closing of the contacts TR5 of this relay will energize the reset coil 107 of the step relay 95 to thus reset this step relay to the lowermost position. The stop cycle relay SP will also be de-energized because the hold in relay contacts HR1 are now open as well as the traverse out relay contacts TO1. De-energization of the stop cycle relay SP will de-energize the spindle clutch 52 and energize the spindle brake 53. Thus, the headstock motor 51 continues to turn at the low speed but the headstock 11 does not turn. As the carriage 15 traverses to the right the second feed limit switch FL2 will be de-actuated to de-energize the solenoid relay SR and the second solenoid SA2. It will now be assumed that the rear slide 17 in its traverse out movement reaches the traverse out limit switch TOL before the traverse right movement of the carriage 15 causes the traverse limit switch TL to be actuated. Actuation of the traverse out limit switch TOL will de-energize the traverse out relay TO, the transverse brake relay TB and the spindle stop relay SS. The de-energization of the traverse out relay TO will energize the differential brake 59 to thus lock the rear slide 17 in its rearmost position.

The traverse right movement of the carriage 15 will continue until the traverse limit switch TL is actuated, which de-energizes the traverse right relay TR, the air bleed solenoid SB and the longitudinal brake relay L. The feed motor 44 is thus dynamically braked through the contacts L2 and L3 of the longitudinal brake relay L. The de-energization of the traverse right relay TR will open the contacts TR5 to de-energize the reset coil 107 of the step relay 95. This completes the two cycles of operation with the carriage 15 in its rearmost position, the cross slide 18 retracted and the rear slide 17 retracted. The spindle brake 53, the differential brake 59, and the spindle low relay SL remain energized. The headstock motor 51 is also energized to turn at a low speed. The automatic cycle lathe is thus ready to start another complete cycling by pressing the start push button 76.

If the rear feed off-on switch 105 is opened by opening the contacts 104 and 109 thereof the rear slide 17 will not become operative at any time during the two complete cycles. Similarly, if the front feed switches 73 and 74 are opened and the front feed switch 113 is closed the cross slide 18 will not operate. In this arrangement, only the rear slide 17 will operate since by closing the third front feed switch 113 the energization of the start cycle relay SC will close the contacts SC4 thereof to energize the traverse in relay TN.

Only a single cycle may be used under control of the finishing cut template 40 by opening the pattern table switch PT1 and closing the pattern table switch PT2. Further the special dog 47 which actuates first feed limit switch FL1 should be removed so that this limit switch is not actuated. The automatic cycle lathe will then go through the finishing cut cycle without first going through the roughing cut cycle.

Another modification may be made in the operation of the lathe by having the rear slide 17 come into use near the beginning of the roughing cut cycle. This may be advantageous where the workpiece is a forging, for example, wherein a flange portion is integral with a shaft portion. Where these two portions join, the forging dies would be unable to get a sharp shoulder, and hence a considerable amount of material removal is required in the machining operation to make a sharp shoulder. The rear slide 17 would thus carry a type of rear tool 61 which would perform this forming operation of removing a heavy cut. This possibility of using the rear slide for a heavy cut is a primary reason for providing a low speed condition of the headstock motor 51. The roughing cut cycle of operation would be started the same as before with the cross slide 18 feeding in, the first timer T1 timing out, and the feed left of the carriage 15 initiated. This initial feed left movement of the carriage 15 could be made a very low speed in order to give time for the rear slide 17 to remove metal from the workpiece before the front tool 20 starts its cut. The rear pickup switch RP would be set to be actuated by the dog 50 very soon after initiation of feed left movement of the carriage 15. This would energize the traverse in relay TN as recited above. Further the first contacts RP1 of this rear pickup switch RP would be opened to de-energize the spindle high relay SH. Since the start cycle relay contacts SC2 are closed, the closing of the spindle high relay contacts SH2 will energize the spindle low relay SL to provide the low speed condition of the headstock motor 51. Thus, the rear slide 17 may go through its traverse in, feed in, and traverse out movements as recited above. This may be effected before or at the same time as the front tool 20 is making a portion of its cut. The low speed of the headstock 11 will continue throughout the cycles in this event. If the high speed of the spindle is desired the spindle switch 71 may be thrown in the opposite direction to close the contacts 72 and open the contacts 75 thereof. This will give high speed of the headstock throughout the entire operation of the lathe. As the carriage 15 is traversing right near the end of the first or second cycles, the special dog 47 will again actuate the rear pickup switch RP. Such actuation will have no effect on the circuit operation, since the contacts F2 are open, and hence the traverse in of the rear slide 17 cannot commence.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a lathe having a base, a workholder axis and a first slide movable relative to said base on a path parallel to said axis, the provision of ways on said first slide oriented thereon at an acute angle to the direction of movement of said first slide, a second slide on said first slide carried ways, a toolholder carried by said second slide to have a compound movement which is the resultant of the independent movement of each of the first and second slides, means connected to said first slide to drive said first slide in one direction along its path, speed change means for changing the feed speed of said drive in accordance with the position of said first slide along its path, a servomotor connected between said first and second slides for driving said second slide relative to said first slide, tracer means controlling said servomotor, a pattern holder, means providing a relative movement between said pattern holder and tracer means in accordance with said compound movement, first and second patterns mounted on said pattern holder, means to establish said first pattern in scanning cooperation with said tracer means during a first work cycle during movement of said first slide in said one direction, means to establish said second pattern in scanning cooperation with said tracer means during a second work cycle during movement of said first slide in said one direction, means to change the scanning relationship of said tracer means from said first pattern to said second pattern for shifting from said first to said second work cycle, selective means connected to said first slide drive means to render said speed change means operative during at least one work cycle, and a switch operatively connected to said selective means and to said speed change means to selectively render said speed change means inoperative.

2. In a lathe having a base and a workholder axis, the provision of ways on said base, said ways being oriented parallel to said workholder axis, a first slide movable on said ways, further ways on said first slide oriented thereon at an acute angle to the direction of movement of said first slide, a second slide on said first slide carried ways, a toolholder carried by said second slide to have a compound movement which is the resultant of the independent movement of each of the first and second slides, a continuously variable speed electric motor drivingly connected to said first slide for driving said first slide in one direction along its ways, an electric circuit connected to said motor for varying said motor speed, speed varying means connected in said motor circuit for varying the motor feed speed in accordance with the position of the first slide on its ways, a servomotor connected between said first and second slides for driving said second slide relative to said first slide, tracer means controlling said servomotor, a pattern holder, first and second patterns mounted on said pattern holder, means to establish said first pattern in scanning cooperation with said tracer means during a first work cycle during movement of said first slide in said one direction, means to establish said second pattern in scanning cooperation with said tracer means during a second work cycle during movement of said first slide in said one direction, means to change the scanning relationship of said tracer means from said first pattern to said second pattern for shifting from said first to said second work cycle, selective means connected to said first slide drive means to render said speed varying means operative during at least one work cycle, and selective means connected to said means to establish said patterns to render said means to change the scanning relationship inoperative so that said pattern holder remains in one position.

3. In a machine tool including a bed, a first slide driven by first power means along said bed on first path, a second slide superposed on said first slide, and second power means for driving said second slide, said second slide being movable along a path acutely angular to the first path; a tracer operatively connected to said second slide and controlling said second power means, a pattern table carrying first and second templates, said table being mounted so that it has a first position wherein said first template co-operates with said tracer and a second position wherein said second template co-operates with said tracer, a switch actuatable by said first slide as it moves along said bed, and a motor operatively connected to said switch and said pattern table to move said table from said first position to said second position upon actuation of said switch, a further switch operatively connected to said switch and said motor in a manner such that actuation of said further switch prevents actuation of said motor by said switch so that said motor holds said table in only one position, said first power means being controllable as to speed and direction by switch means actuatable by said first slide.

References Cited in the file of this patent
UNITED STATES PATENTS

| | | |
|---|---|---|
| 471,674 | Loveland | Mar. 29, 1892 |
| 571,901 | Heald | Nov. 24, 1896 |
| 1,166,126 | Gridley | Dec. 28, 1915 |
| 1,428,801 | Oulton | Sept. 12, 1922 |
| 1,568,641 | Thacher | Jan. 5, 1926 |
| 2,032,597 | Shaw | Mar. 3, 1936 |
| 2,078,696 | Svenson | Apr. 27, 1937 |
| 2,080,830 | Mobius | May 18, 1937 |
| 2,372,427 | Johnson | Mar. 27, 1945 |
| 2,433,048 | Himoff | Dec. 23, 1947 |
| 2,437,570 | Von Zelewsky | Mar. 9, 1948 |
| 2,475,326 | Johnson | July 5, 1949 |
| 2,540,323 | Cross | Feb. 6, 1951 |
| 2,557,824 | Hornfeck | June 19, 1951 |
| 2,559,138 | Waterson | July 3, 1951 |
| 2,586,183 | Stewart | Feb. 19, 1952 |